United States Patent [19]

Iijima et al.

[11] Patent Number: 4,521,289
[45] Date of Patent: * Jun. 4, 1985

[54] METHOD AND APPARATUS FOR INSTALLATION OF A MEMBRANE TO AN ELECTROLYTIC CELL

[75] Inventors: Tokuzo Iijima, Kobe; Toshiharu Yamamoto, Akashi; Kazuo Kishimoto; Takamichi Komabashiri, both of Takasago; Toshiji Kano, Kobe; Akinori Hisanaga, Kakogawa, all of Japan

[73] Assignee: Kanegafuchi Kagaku Kogyo Kabushiki Kaisha, Osaka, Japan

[*] Notice: The portion of the term of this patent subsequent to May 19, 1998 has been disclaimed.

[21] Appl. No.: 257,416

[22] Filed: Apr. 24, 1981

Related U.S. Application Data

[63] Continuation of Ser. No. 971,430, Dec. 20, 1978, Pat. No. 4,268,373.

[30] Foreign Application Priority Data

Dec. 26, 1977 [JP] Japan ............................ 52-178714[U]

[51] Int. Cl.³ .................... C25B 9/00; C25B 11/02; C25B 13/02
[52] U.S. Cl. .................................... 204/253; 204/279
[58] Field of Search ................... 204/252–253, 204/258, 266, 296, 279, 254–257, 263–265, 282–283

[56] References Cited

U.S. PATENT DOCUMENTS

| | | | |
|---|---|---|---|
| 3,883,415 | 5/1975 | Shibata et al. | 204/266 X |
| 3,923,630 | 12/1975 | Argade et al. | 204/266 |
| 3,980,544 | 9/1976 | Adams et al. | 204/253 X |
| 3,981,788 | 9/1976 | Kokubu et al. | 204/286 X |
| 4,268,373 | 5/1981 | Iijima et al. | 204/252 |

*Primary Examiner*—Donald R. Valentine
*Attorney, Agent, or Firm*—Armstrong, Nikaido, Marmelstein & Kubovcik

[57] ABSTRACT

Method and apparatus of installation of a membrane to a finger type electrolytic cell are provided, which comprise covering the horizontal surfaces of a cathode not opposing an anode with a membrane installation frame having a collar, positioning the membrane substantially parallel to the vertical surfaces of the cathode, and installing and securing the membrane to the collar by bolting. Not only is operation efficiency for the membrane installation to the electrolytic cell markedly improved, but also, in the case of an ion exchange membrane, an alkali metal hydroxide liquor hardly containing an alkali metal chloride is produced. According to the invention, a conventional asbestos diaphragm finger type electrolytic cell is advantageously converted to an ion exchange membrane electrolytic cell.

5 Claims, 3 Drawing Figures

METHOD AND APPARATUS FOR INSTALLATION OF A MEMBRANE TO AN ELECTROLYTIC CELL

This is a continuation of application Ser. No. 971,430, filed Dec. 20, 1978 now U.S. Pat. No. 4,268,373.

DETAILED DESCRIPTION OF THE INVENTION

The present invention relates to a method and an apparatus of installation of membranes to an electrolytic cell, more particularly, to a finger type electrolytic cell of an alkali metal chloride solution.

Sodium hydroxide has been commercially produced using asbestos or modified asbestos diaphragm cells. However, sodium hydroxide manufactured by the asbestos or modified asbestos method is poor in quality and about 0.9 to 1.2% by weight of sodium chloride is usually contained in a 50% sodium hydroxide liquor. Sodium chloride contained in sodium hydroxide liquor produced by the asbestos or modified asbestos cell may be removed by an ammonia extraction method, hydrated sodium hydroxide method or the like, but when each of these methods is put into practice on an industrial scale, sodium hydroxide liquor is purified, at best, only to an extent ranging from about 500 to 1,000 ppm, and still worse, a relatively large expenditure is required for purification. Sodium hydroxide used for the rayon industry can permit the presence of only 200 ppm or less of sodium chloride in a 50% sodium hydroxide liquor. Accordingly, it is rather difficult to produce sodium hydroxide usable for the rayon industry at a reasonable and moderate cost by the purification of sodium hydroxide produced by asbestos or modified asbestos diaphragm methods.

When the asbestos or modified asbestos diaphragm cells are converted to the ion exchange membrane cells according to the present invention, not only is the quality of the product improved, but also the operation of an electrolytic plant becomes feasible. That is, due to the fact that there is no falling out of salts in the evaporation system, washing of the slurry lines and the vessels and the like is not required, and the operation may be carried out automatically. Another advantage obtained by the conversion of the asbestos or modified asbestos diaphragm method to the ion exchange membrane method is that a cell liquor hardly containing NaCl is obtained. Further advantage is that sodium hydroxide which is consumed in own factories or within the Kombinat may be supplied directly without being concentrated by evaporation to from 40 to 50%, while asbestos or modified asbestos diaphragm cell liquor containing a large amount of sodium chloride must be concentrated to from 40 to 50%, even though self-consumed in the factories or consumed within the Kombinat, and a low concentrated sodium hydroxide provides satisfaction. By converting to the ion exchange membrane method, sodium hydroxide substantially containing no sodium chloride is obtained, and thus may be supplied for a variety of uses immediately by being cooled to a desired temperature, or may be mixed with a 50% concentrated sodium hydroxide to a desired concentration and then supplied for use.

However, it is very difficult to install an ion exchange membrane to a finger type electrolytic cell comprizing winding portions. The installation in a plain way of an ion exchange membrane onto the curved surfaces of a cathode does not fail to provide increased concentration of an alkali metal chloride contained in an alkali metal hydroxide liquor prepared.

On the other hand, hydrodynamically permeable perforated membranes are known as microporous membranes. It is also difficult to locate these membranes to a finger type electrolytic cell which is typical and common as an asbestos diaphragm cell, so that these are not yet in use on an industrial scale.

In order to solve the problems as aforesaid, the present inventors have studied a method and an apparatus which enable simple and easy installation of a substantially flat membrane to a finger type electrolytic cell.

A first object of the present invention is to provide a method and an apparatus for installing a cation exchange membrane and/or a microporous membrane to a finger type electrolytic cell very feasibly.

A second object of the present invention is to provide a method and an apparatus for converting an asbestos or modified asbestos diaphragm cell to a cation exchange membrane cell, producing an alkali metal hydroxide liquor containing little amount of an alkali metal chloride or the like.

A third object of the present invention is to provide a method and an apparatus for producing an alkali metal hydroxide of high quality hardly containing an alkali metal chloride or the like by the use of a cation exchange membrane installation frame.

A fourth object of the present invention is to provide a method and an apparatus which are free from a danger to health or environmental contamination due to asbestos by the conversion of an asbestos or modified asbestos diaphragm cell to an ion exchange membrane cell.

A fifth object of the present invention is to provide a method and an apparatus which enable the production of an alkali metal hydroxide in an economically advantageous way.

These and other objects can be accomplished by the steps of covering the horizontal surfaces of a cathode not opposing an anode with a membrane installation frame having a collar, positioning the membrane substantially parallel to the vertical surfaces of a cathode, and installing and bolting the membrane to the collar, whereby installation of the membrane is facilitated and electrolysis can be carried out at a low cell voltage while reducing the concentration of an alkali metal chloride contained in an alkali metal hydroxide liquor.

As finger type electrolytic cell useful in the present invention there are included not only a finger type construction cell such as that described at page 93, *Chlorine—Its Manufacture, Properties and Uses,* edited by J. S. Scone, issued Reinhold Publishing Corporation, New York, 1962, incorporated herein by reference, but also a flattened tube type construction. Nowadays, a flattened tube type construction cell is also generally referred to as a finger type electrolytic cell. As alkali metals, there are included sodium, potassium and the like.

An anode in a finger type electrolytic cell is commonly located and embedded to an electro-conductive bottom plate or side plate. A membrane installation frame is positioned to cover the horizontal surfaces of a cathode not opposing the anode. When the membrane installation frame is electrically conductive, it is usually insulated from the cathode by insertion of a packing, lining and any other suitable means.

It is a feature of the present invention that installation of the substantially flat membrane to the curved surfaces of the cathode could be facilitated by providing the collar with the installation frame. The collar is preferably located at about 90 degrees or less, more preferably from about 90 degrees to about 30 degrees to the flat portion of the membrane installation frame. The most preferable is about 90 degrees since neither expansion nor contraction of the membrane is required. It is desired to locate, at least, the collar close to the bottom plate embedding the anode at about 60 degrees to about 30 degrees, thereby facilitating assembly of the anode and the cathode to which the membrane was positioned. In the case of less than 90 degrees, the membrane has to be flared to conform with the collar angle. The smaller the angle, the larger flare of the membrane. While the flared membrane is made from a polymer by heat-moulding without so much difficulty, it is rather difficult to process the flat membrane to be the flared membrane. Accordingly, the collar angle is decided upon according to difficulty or easiness of processing of the membrane and the operation efficiency. Therefore, the lower limit of 30 degrees is a matter of practice, not theory. Inversely, in the case of more than 90 degrees, the membrane must be installed to the collar by being contracted or folded. Care must be taken that the operation efficiency of assemblage of the anode and the cathode may be disturbed, when the collar angle close to the anode enbedded bottom plate is more than 90 degrees.

The membrane is installed and secured to the collar of the membrane installation frame by bolting. Securing by bolting may be accomplished by screw bolts; bolts and nuts; the press plates and bolts; the press plates, bolts and nuts; the press plates, packings and bolts; the press plates, packings, bolts and nuts; the press plates, bolts, nuts and washers; the press plates, packings, bolts, nuts and washers; and the like. Any known washers may be used and spring washers may be suitably used.

The membrane is secured to the collar even without using the press plate, but the press plate enables easier and more complete securing. In cases where no press plate is employed, it is necessary to provide the secured portion of membrane with hardness by thickening that portion beforehand upon the production of membrane or by folding the membrane twofold or threefold and heat-fusing. More effective securing is also obtained by applying bolts at shorter intervals than in the case where the press plate is used. When a microporous membrane is employed, insufficient securing is not necessarily problematical as compared with ion exchange membrane, since it is inherently hydrodynamically permeable.

The membrane installation frame, the press plate and the like have to be made from materials which are resistant to anolyte or the like. As these materials, titanium, zirconium, hafnium, tantalum or an alloy thereof such as titanium-palladium, titanium-tantalum, hastelloy or the like. As the organic materials other than the metallic materials as aforesaid, FRP, heat-resistant polyvinyl chloride, polypropylene, fluorocarbon polymer, fluorocarbon polymer or rubber lined metals or the like. Examples of fluorocarbon polymer are polymers of tetrafluoroethylene hexafluoroproplylene, perfluoroalkylvinylether, copolymers thereof, polytrifluorochloroethylene, polyfluorovinylidene and the like.

When the membrane installation frame is made from an electro-conductive material, a packing as an insulator is interposed between the frame and the cathode, otherwise, lining or coating is applied to the surface of the cathode or the surface of the frame facing the cathode.

When the membrane installation frame made from plastics is employed, washers had better be used. The press plate is preferably made from metallic materials and the plastic press plate is desirably used with washers. As the materials for bolts, nuts, washers, metallic materials such as titanium, zirconium, hafnium, tantalum or an alloy thereof, for example, titanium-palladium alloy, titanium-tantalum alloy and the like are preferable. Bolts made from organic materials such a polytetrafluoroethylene, polyhexafluoropropylene or the like may also be employed.

In an attempt to accomplish more perfect securing and sealing, it is preferred to interpose a packing between the collar and the membrane, further between the membrane and the press plate, if desired. As a packing, materials resistant to anolyte such as polytetrafluoroethylene are preferable. As polytetrafluoroethylene, "Teflon (Registered Trademark of E. I. Du Pont de Nemours and Company)" thin film or the like may be suitably used which are known as a porous film or tape seal. Thin film of fluorocarbon polymer other than polytetrafluoroethylene such as tetrafluoroethylene-hexafluoroproplylene coplymer may also be used. Sealants such as "Teflon" paste, silicone grease and the like may be used with a packing to provide more perfect serucing and sealing.

The membrane formed in a cylindrical shape is preferably used. The cylindrical membrane is obtained by extrusion moulding, heat-sealing, sticking by adhesives and the like.

When the cation exchange membrane is employed, cell liquor concentration (sodium hydroxide concentration) can be enhanced over 30 to 40%. As cation exchange membranes, polyfluorocarbon membrane with sulfonic acid group, sulfon amide group, carboxylic acid group, for example, "Nafion #110", "#215", "#315", "#425" and the like which are produced and sold by E. I. Du Pont de Nemours and Company may be exemplified.

In cases where the present invention is applied to a microporous membrane, there are advantages that back flow of $OH^-$ is reduced due to the amount of flux per a unit area of membrane being increased and the sodium hydroxide concentration in a cell liquor can be raised at the same oxygen concentration in chlorine. The operation costs can be therefore reduced on account of the decrease in cell voltage and the increase in the cell liquor concentration. Although it is difficult to apply an ion exchange membrane method to an electrolysis plant where the subterranean brine is used, if a microporous membrane method is carried out according to the method and apparatus of the present invention, operation costs can be reduced. As microporous membranes, "Nafion #701", "#710" or the like are enumerated which are manufactured and sold by E. I. Du Pont de Nemours and Company.

The present invention will be illustrated in more detail by way of example, which example is not to be construed in any manner to be limiting of the invention.

EXAMPLE

Figure 1:
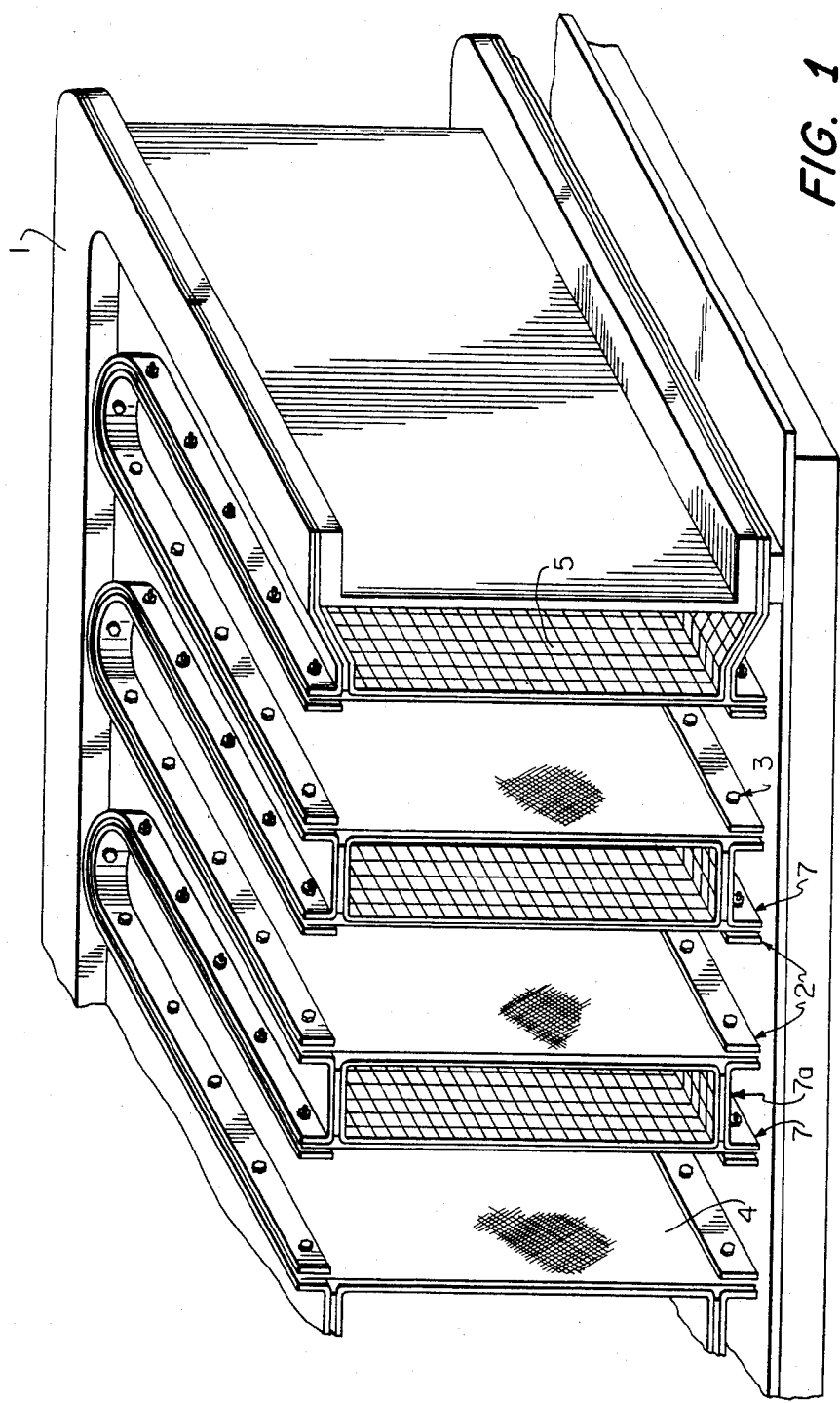
FIG. 1 is a perspective vertical sectional view of a finger type electrolytic cell wherein the membrane installation frame is located so as to cover the horizontal surfaces of the cathode not opposing the anode, to which the membrane is installed.
Figure 2:
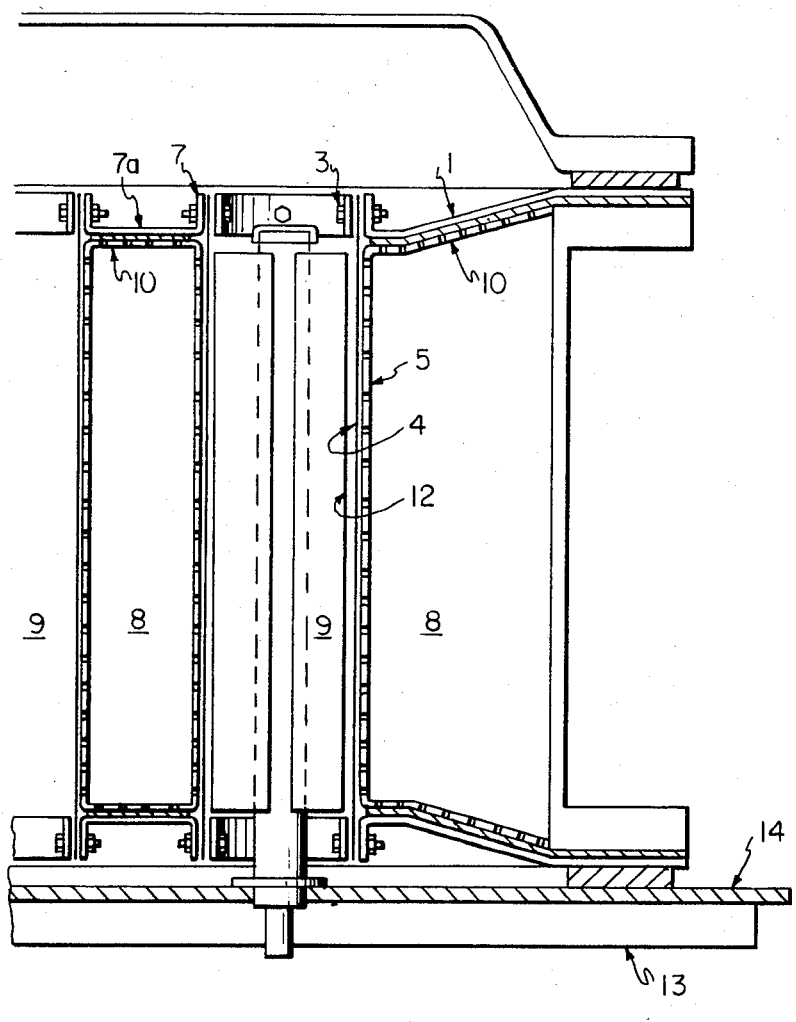
FIG. 2 illustrates an enlarged partially sectional view of FIG. 1.
Figure 3:
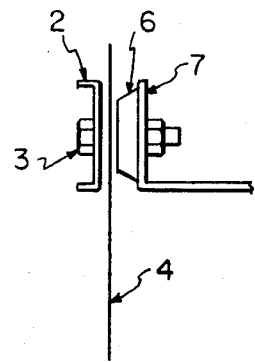
FIG. 3 is a sectional view of the important part illustrating the portion of membrane installation to the installation frame.

As is shown in FIG. 1, membranes 4 formed in a cylindrical shape are positioned to collars 7 located at about 90 degrees to the flat portion 7a of a membrane installation frame. The membranes are positioned substantially parallel to the vertical surfaces 11 of cathodes and secured by means of bolts and nuts 3 to the collars using press plates 2, having brims angled outwardly of the membranes interposing a packing 6 between the collar and the membrane (FIG. 3). Thus, a cathode compartment 8 and an anode compartment 9 are perfectly isolated from each other (FIG. 2). The membranes installation frames 1 are located in a manner that the horizontal surfaces 10 of the cathode at right angles to a locating direction of the anode 12 to a bottom plate 13 are covered with the flat portion 7a of the installation frame. The bottom plate 13 is insulated from the cathode box 5 by inserting an insulator 14 between the two. As a membrane, the cation exchange membrane "Nafion #315" produced by E. I. Du Pont de Nemours and Company is employed.

To the anode compartment is a hydrochloric acid-containing sodium chloride solution continuously supplied and deionized water is continuously fed to the cathode compartment, then 2,000 A electric current per unit anode is supplied to the cell. The anode current density is 25 A/dm$^2$. The brine supplied is 3N with respect to the NaCl concentration and the HCl concentration is 0.2N in the brine. After the continuous operation for 7 days, the NaCl concentration is as low as 20 ppm in the catholyte and the NaOH concentration is 16% in the catholyte.

What we claim is:

1. Method of installation of a membrane to finger type electrolytic cell for the production of chlorine, hydrogen and an alkali metal hydroxide by electrolysis of an aqueous alkali metal chloride solution which cell comprises a plurality of anodes and cathode box providing a cathode between adjacent anodes, and a membrane between adjacent anodes and cathode, which comprises covering the upper and lower horizontal surfaces of the cathode not opposing the anodes with upper and lower membrane installation frames having collars; positioning cation exchange membranes in a cylindrical shape substantially parallel to the vertical surfaces of said cathodes, and installing and securing the membranes to the collars by bolting press plates having brims thereto.

2. A finger type electrolyte cell for the production of chlorine, hydrogen and an alkali metal hydroxide by electrolysis of an aqueous alkali metal chloride solution which cell comprises a plurality of anodes and cathode box providing a cathode between adjacent anodes, and a membrane between adjacent anodes and cathodes, further comprising upper and lower membrane installation frames having collars positioned so as to cover the upper and lower horizontal surfaces of the cathodes not opposing the anodes, cation exchange membranes in a cylindrical shape located substantially parallel to the vertical surfaces of the cathodes, and bolting means for installing and securing the membranes to the collars by bolting said bolting means including press plates with brims.

3. The cell of claim 2, wherein said bolting means further includes bolts and nuts.

4. The cell of claim 2, wherein said bolting means further includes packings, bolts and nuts.

5. The cell of claim 2 wherein said bolting means further includes packings, bolts, nuts and washers.

* * * * *